United States Patent [19]

Berstein

[11] 4,289,431
[45] Sep. 15, 1981

[54] BORING TOOL WITH FLOATING BLADES

[75] Inventor: Garrj Berstein, Erkelenz, Fed. Rep. of Germany

[73] Assignee: Wilhelm Hegenscheidt GmbH, Erkelenz, Fed. Rep. of Germany

[21] Appl. No.: 126,852

[22] Filed: Feb. 28, 1980

Related U.S. Application Data

[63] Continuation of Ser. No. 904,552, May 10, 1978, abandoned.

[30] Foreign Application Priority Data

May 25, 1977 [DE] Fed. Rep. of Germany ....... 2723622

[51] Int. Cl.³ .................... B23B 51/00; B23B 39/06
[52] U.S. Cl. .................................. 408/154; 408/13; 408/158
[58] Field of Search .................. 408/13, 73, 74, 110, 408/111, 147, 148, 154, 155, 158, 705

[56] References Cited

U.S. PATENT DOCUMENTS

| | | | |
|---|---|---|---|
| 655,600 | 8/1900 | Brown et al. | 408/154 |
| 1,135,057 | 4/1915 | Schultis | 408/74 |
| 2,273,228 | 2/1942 | Smith | 408/147 |
| 2,990,730 | 7/1961 | Pougnand | 408/148 |
| 3,011,368 | 12/1961 | Hayes | 408/13 |
| 3,246,545 | 4/1966 | Shugars | 408/154 |

Primary Examiner—Harrison L. Hinson
Attorney, Agent, or Firm—Michael J. Striker

[57] ABSTRACT

A boring tool comprising a tool head provided with a slot extending transverse to the axis of the tool head in which a pair of opposite cutting knives are guided movable in longitudinal direction of the slot. A spacer is guided in the tool head movable between a first and a second position. In the first position the spacer is located between inner ends of the cutting knives which are spring biased to engage the spacer to be movable with the latter in the longitudinal direction of the slot while holding the cutting knives in a cutting position. In the second position the spacer frees the cutting knives to move under the influence of the biasing springs toward each other to an inactive position.

18 Claims, 9 Drawing Figures

BORING TOOL WITH FLOATING BLADES

This is a continuation, of application Ser. No. 904,552, filed May 10, 1978 now abandoned.

BACKGROUND OF THE INVENTION

Boring tools are known in the art in which a tool head is provided with a slot extending transverse to the axis of the tool head and in which a pair of opposite cutting knives are arranged. Such a boring tool is for instance disclosed in the "Schriftenreihe Feinbearbeitung: Feinbohren und Feinbearbeitung von Bohrungen" January, 1958, page 28. The boring tool disclosed therein has opposite cutting knives mounted in fixed position which therefore have to be removed from the tool head after the bore has been machined to avoid markings on the bore surface during retracting of the boring tool.

The same article discloses on page 43 another boring tool in which a pair of opposite cutting tools may be moved toward and away from each other by an oppositely threaded pin engaged into correspondingly threaded bores in the tool cutting knives. Thereby the cutting knives may be adjusted easily to any desired tolerance of the bore to be finished, but also in this construction the two cutting knives have to be removed from the tool head before the latter is retracted in axial direction of the finished bore in order to avoid markings during withdrawing of the tool head from the bore.

Such boring tools may also be combined with other tools, for instance with rolling tools, in order to finish cylinder bores in one operation. Such a combined tool is for instance disclosed in the U.S. Pat. No. 3,973,319. In this construction a rolling tool is arranged behind the cutting tool and the cutting tool carries out a rough finishing of the inner surface of the bore whereas the following rolling tool produces during the same operation a fine surface quality of the bore surface. In this construction too, the boring tool has to be removed from the tool head in order to assure that the finely finished surface is not damaged during retraction of the combined tool.

Such a necessary removal of the cutting tool is disagreeable, since, on the one hand, it prevents automatization of the tool in for instance a deep boring machine and, on the other hand, it results in a time loss during manual operation since the tool spindle in deep boring machines has to be brought at the end of the boring operation to a suitable position permitting withdrawal of the cutting knives. Furthermore, such an operation is also disagreeable for the operator since the boring tool is covered with oil.

The DT OS No. 22 23 696 discloses a boring tool in which a pair of opposite knives, guided in a slot transverse to the axis of the boring tool, may be moved in radially outward direction by a cone movable between the inner ends of the knives and this adjustment must also be carried out by hand so that an automatic operating cycle has to be interrupted for manually adjusting the knives. In this construction, too, the knives have to be retracted by adjusting the position of the cone in order to avoid damage to the finished bore surface during withdrawal of the boring tool and the readjustment of the knives to the necessary working diameter has to be carried out very carefully in order to provide the same result during finishing of a second bore.

SUMMARY OF THE INVENTION

It is an object of the present invention to provide a boring tool of the aforementioned kind which avoids the above-mentioned disadvantages thereof.

It is a further object of the present invention to provide a boring tool in which a pair of cutting knives can be moved in a simple manner between a working and an inactive position thereof.

With these and other objects in view, which will become apparent as the description proceeds, the boring tool according to the present invention mainly comprises a tool head having an axis, a pair of opposite cutting knives mounted in said tool head movable transverse to said axis, each of the cutting knives having a face extending substantially parallel to the axis and being opposite to a corresponding face of the other cutting knife. The boring tool comprises further biasing springs connected to the cutting knives for biasing the same toward each other and a spacer normally abutting against the above-mentioned faces of the cutting knives and mounted in the tool head movable with the cutting knives in a direction normal to the axis of the tool head, in which the spacer is withdrawable from between the aforementioned faces of the cutting knives to permit the latter to move toward each other under the influence of said biasing spring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
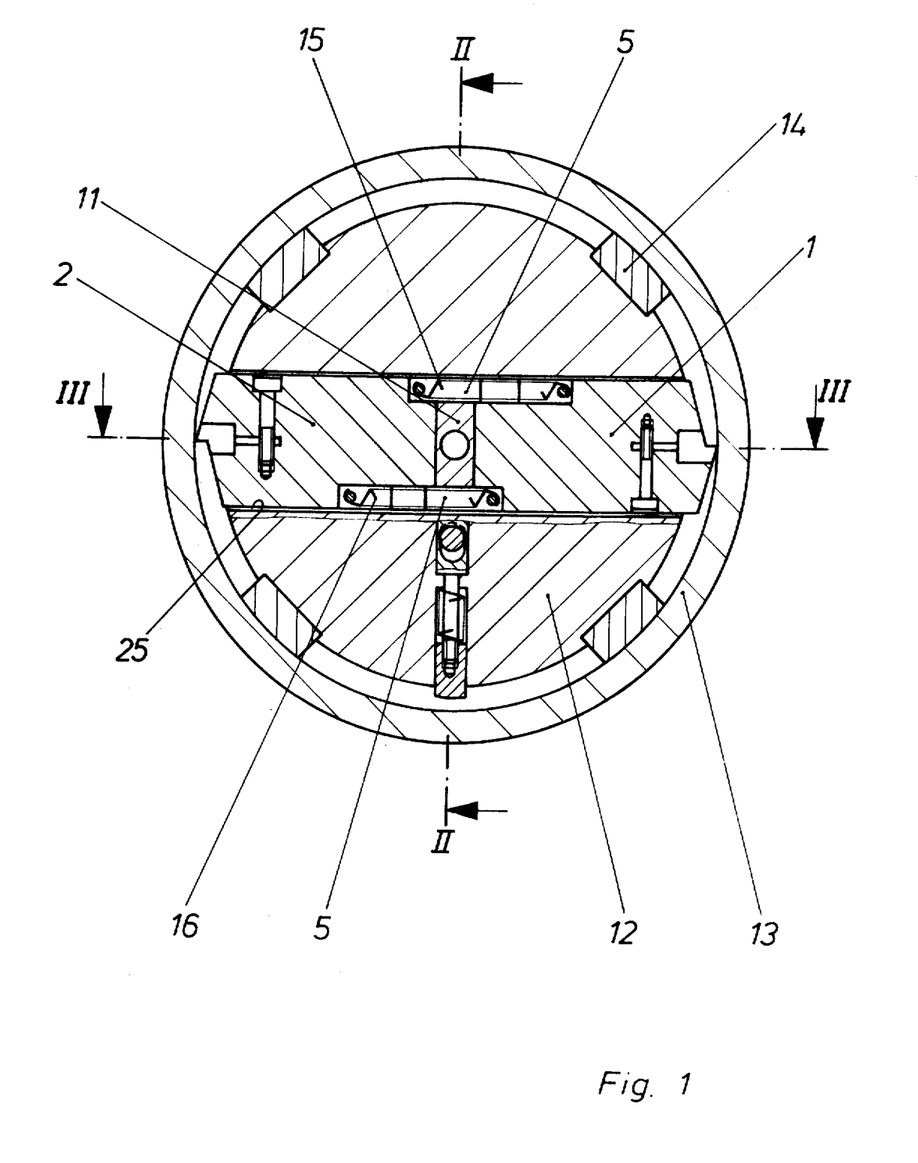
FIG. 1 is a cross-section taken along the line I—I of FIG. 2 through a workpiece and a boring tool according to the present invention located in the bore of the workpiece.

FIG. 1 illustrates a transverse cross-section through a first embodiment of a boring tool according to the present invention. As shown in FIG. 1, the tool head 12 of the boring tool is arranged in the bore of a workpiece 13 and guided therein for movement in longitudinal direction and for turning about its axis by a plurality of circumferentially spaced guide bars 14. Such guide bars 14 are preferably used during machining of deep bores, but may be omitted if the tool head 12 is otherwise sufficiently supported. Mounted in a transverse slot 25 of the tool head 12 are two opposite cutting knives 1 and 2. A pair of tension springs 15 and 16, respectively connected at opposite ends to the knives 1 and 2, bias the latter toward each other and toward parallel faces of a spacer member 11 located between inner end faces of the knives for maintaining the latter in an active cutting position for machining the inner surface of the bore in the workpiece 13. The faces of the spacer member 11 against which the end faces of the knives abut extend parallel to each other and are preferably hardened so as to resist without plastic deformation the radially inwardly extending force components exerted by the knives during the cutting operation. This arrangement will assure that the outer ends of the knives are always maintained at a proper distance from each other during machining of successive bores. The spacer member 11 is formed with an axial blind bore 27 (FIG. 2) in which a spring 17 is located, which abuts with opposite ends respectively against the bottom of the blind bore and an end face of a pocket 26 formed in the tool head 12 for the reception of the spacer member 11, when the latter is shifted to a position outside the opposite ends of the knives 1 and 2, in the manner as will be explained later on. In order to prevent buckling of the spring 17, the latter is guided by a guide bolt 28. The spacer member 11 is further provided with a laterally extending striker portion 19 which is pressed by the spring 17 against the end of a bolt 20. The bolt 20 is slidably guided in a bushing 21 extending in axial direction of the tool head and the bolt 20 is provided adjacent the outer end thereof with an annular groove 22, preferably of V-shaped cross-section. By pressing the bolt 20 inwardly, that is toward the right, as viewed in FIG. 2, the spacer member 11 is moved against the force of the spring 17 out of the region between the inner ends of the knives 1 and 2 so that the latter are moved under the influence of the springs 15 and 16 towards each other to thereby disengage the outer cutting edges of the knives from the inner surface of the bore in the workpiece 13. In this position of the knives the boring tool may be withdrawn from the finished bore in the workpiece 13 without the danger of forming marks in the bore surface during axial withdrawal of the boring tool. In this position it is also possible to remove the cutting knives 1 and 2 together with the springs 15 and 16 from the slot 25, if this is for instance necessary in order to sharpen the cutting edges of the knives. The spacer member 11 is held in its rearmost position in the pocket 26 by the nose 23 of an operating member 24 biased by a spring 18 in outward direction. If the operating member 24 is pressed inwardly against the force of the spring 18, the nose 23 is removed from the groove 22 in the bolt 20 and the latter is thereby released. The spring 17 may now push the spacer member 11 out of the pocket 26 and between the inner ends of the knives 1 and 2. To make this return movement of the spacer member 11 between the inner ends of the knives 1 and 2 possible, the spacer member 11 is provided at its front or left end, as viewed in FIG. 3, with a wedge portion 31, whereas the knives 1 and 2 are provided at the right side of their inner ends, as viewed in FIG. 3, with correspondingly beveled surfaces 29 and 30.

Figure 2:
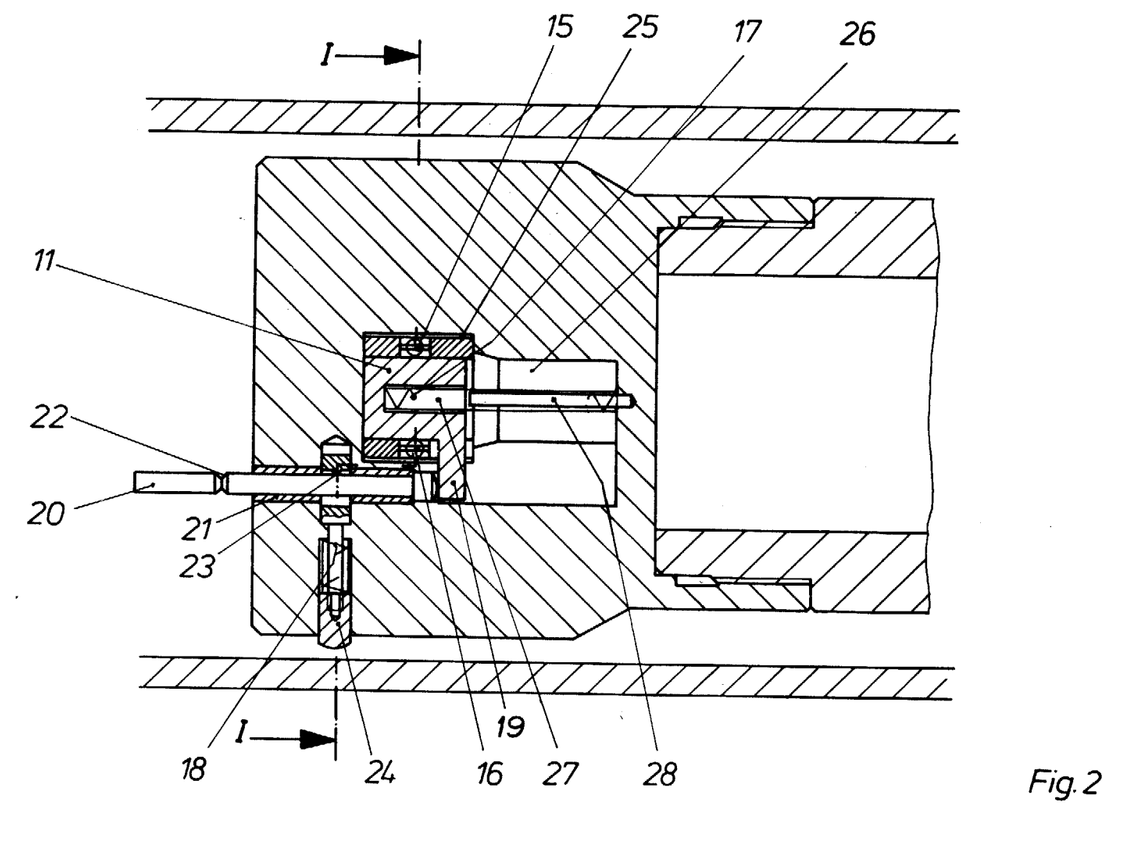
FIG. 2 is a cross-section taken along the line II—II of FIG. 1.
Figure 3:
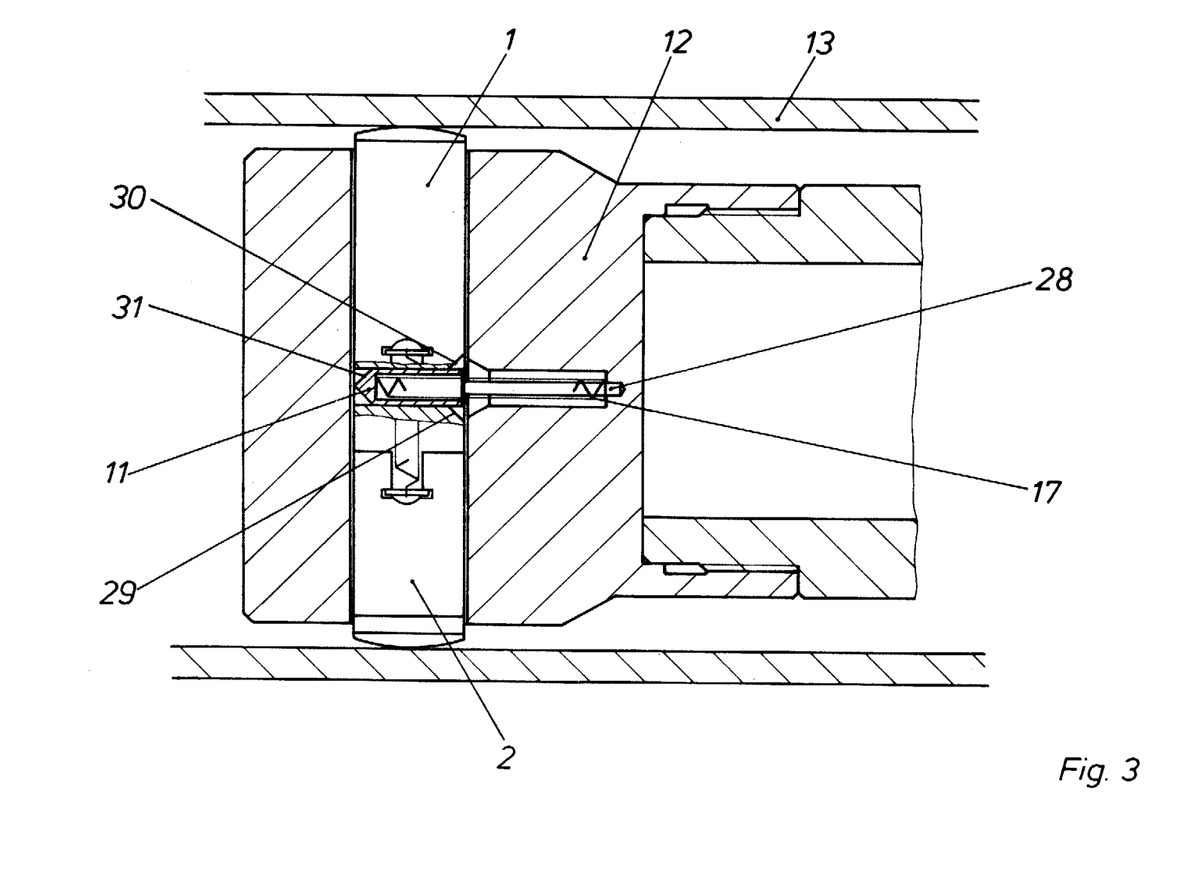
FIG. 3 is a cross-section taken along the line III—III of FIG. 1.

The actuation of the bolt 20, respectively of the operating member or operating button 24, may be carried out in an automatic manner. For instance, an abutment may be provided in the path of the bolt 20 against which the outer end of the latter abuts at the end of the forward movement of the boring tool so that the bolt 20 is moved inwardly and the spacer member 11 thereby moved out, in the manner as described before, from between the opposite ends of the knives into the pocket 26. The operating button 24 can for instance be automatically operated by a finger which at the end of the retracting movement of the tool, or shortly before, pushes the button 24 inwardly to thereby release the bolt 20 so that the spacer member 11 is moved under the action of the spring 17 again to its position between the opposite ends of the cutting knives 1 and 2.

Figure 4:
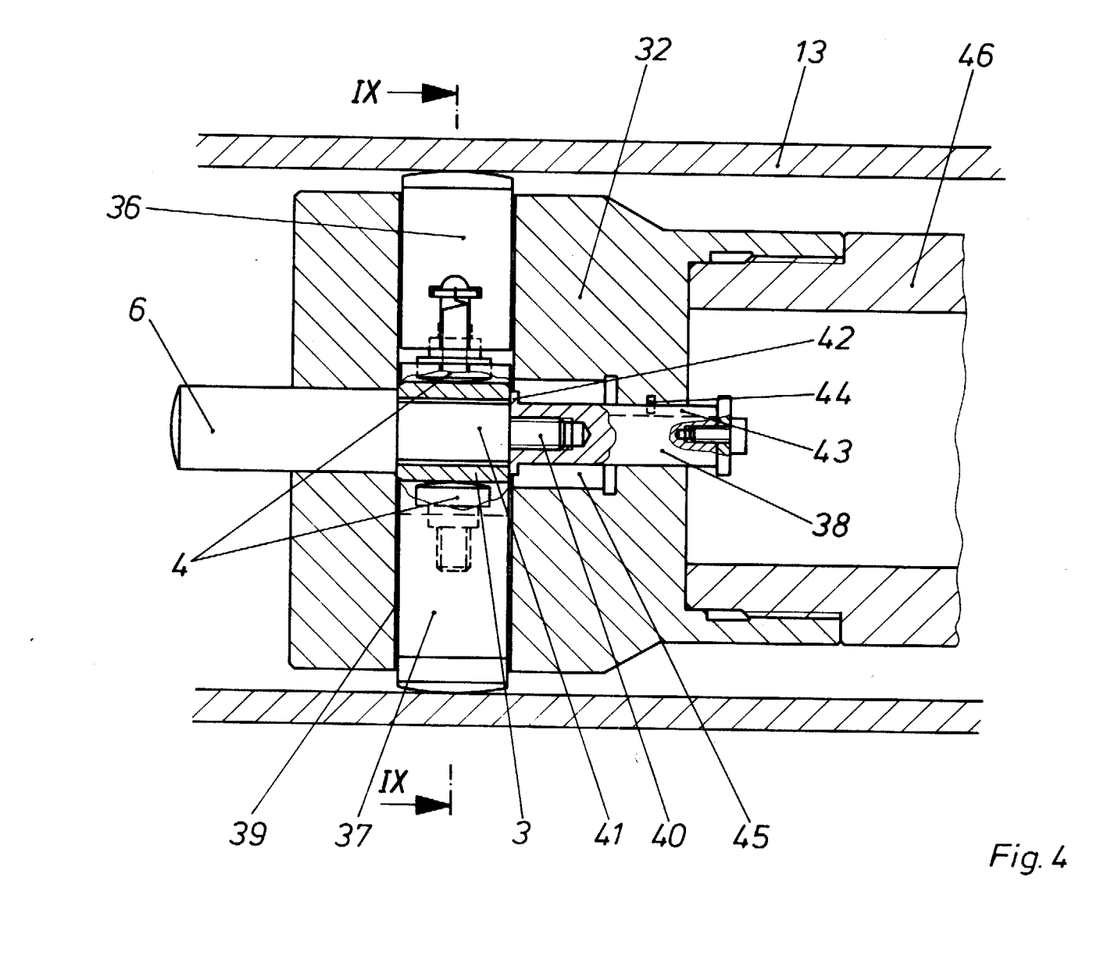
FIG. 4 is a longitudinal section through another embodiment of a boring tool according to the present invention in which the spacer is mechanically movable between two positions.
Figure 9:
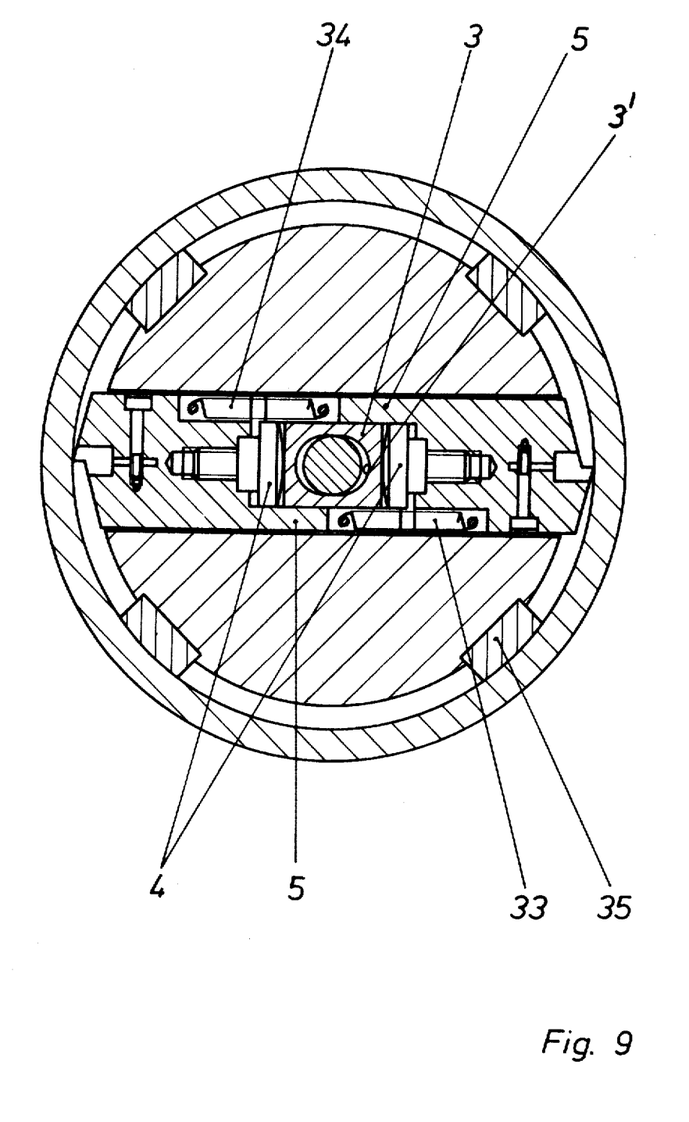
FIG. 9 is a transverse cross-section taken along the line IX—IX of FIG. 4.

FIG. 4 illustrates in longitudinal cross-section a further embodiment according to the present invention. In this embodiment the tool head 32 carried by a boring tuler 46 is guided by guide bars 35 (FIG. 9) for rotation and axial movement in the bore of a workpiece 13. The tool head 32 is again formed with a transverse slot or passage 39 in which the knives 36 and 37 are guided for movement in longitudinal direction and urged toward each other by tension springs 33 and 34 best shown in FIG. 9, respectively connected at opposite ends to the knives 36 and 37. A spacer member 3 of rectangular cross-section is again located between the inner ends of the knives 36 and 37 and the latter abut by means of adjustable stops 4, respectively screwed into corresponding bores of the knives 36 and 37, against end faces of the spacer member 3. The side faces of the spacer member 3 are guided along guide tongues 5 respectively projecting inwardly from endfaces of the knives 36 and 37, as best shown in FIG. 9. An oblong bore 3' extends axially through the spacer member 3 and this oblong bore has its longest dimension, as best shown in FIG. 9, in the longitudinal direction of the slot or passage 39. A bolt 6 extends through a central bore of the tool head 32 projecting with its left end, as viewed in FIG. 4, beyond the left front face of the tool head 32. The bolt 6 has an integral circular portion 41 extending through the oblong bore 3' through the spacer member 3 and having a smaller diameter than that of the remainder of the bolt 6. Preferably, the length of the cylindrical portion 41 is slightly greater than that of the spacer member 3. Integrally formed with the cylindrical portion 41 is a threaded portion 40 having again a smaller diameter than that of the portion 41. A safety bolt 38 coaxial with the bolt 6 is threadingly connected to the threaded portion 40. The safety bolt 38 is provided at its left end, as viewed in FIG. 4, with an annular flange 42. In the assembled position the spacer member 3 is thus held with a very small axial clearance between a shoulder formed between the bolt 6 and the cylindrical portion 41 of smaller diameter and the flage 42 of the safety bolt 38. Since the cylindrical portion 41 extends throught the oblong bore 3' of the spacer member and since the length of the cylindrical portion 41 is slightly greater than the spacer member, the latter and the two knives 36 and 37 may together carry out a slight pendulating movement as far as the oblong bore 3' permits.

If now the tool head 32, after finishing its working stroke, abuts with the outer end of the bolt 6 against a non-illustrated abutment, then the bolt 6 is moved in axial direction into the tool head 32. Thereby it pushes the spacer member 3 out from between the stops 4 at the inner ends of the knives 36 and 37 into a receiving pocket 45 formed in the tool head 32 to the right side of the slot 39, as viewed in FIG. 4. The pocket 45 has parallel side walls which guide the spacer member 3 during this movement and prevent turning of the latter. In this position the two knives 36 and 37 abut with the adjustable stops 4 thereof against the outer surface of the bolt 6, the diameter of which is smaller than the dimension of the spacer member 3 in the longitudinal direction of the slot 39 so that the two knives move toward each other in correspondence with the difference of the two dimensions. In this position of the knives, the boring tool may be withdrawn while damage of the machined bore surface in the workpiece 13 is positively prevented. In order to bring the knives 36 and 37 again back to their working position it is only necessary that the safety bolts 38 is again pressed inwardly toward the left, as viewed in FIG. 4, until the spacer member 3 is again located in the position as shown in FIG. 4. This advance of the safety bolt during the retracting of the boring tool may be automatically carried out by providing a nonillustrated abutment against which the safety bolt 38 abuts at the end of the return stroke of the tool lead 32. The safety bolt 38 could also be in the form of an armature for a nonillustrated elelctromagnet located in the boring tool 46 which upon energizing would move the safety bolt 38 in axial direction.

In order to replace the knives 36 and 37 together with the springs 33 and 34, or the spacer member 3, it is only necessary to unscrew the threaded portion 40 from the safety bolt 38, whereby a turning of the latter is prevented by a pin 44 engaging in a longitudinal groove 43 formed in the safety bolt 38. The bolt 6 together with the portions 40 and 41 may then be withdrawn in axial direction out of the tool head 32 and the two knives 36 and 37 together with the spacer member may thereafter be withdrawn from the slot 39.

Figure 5:
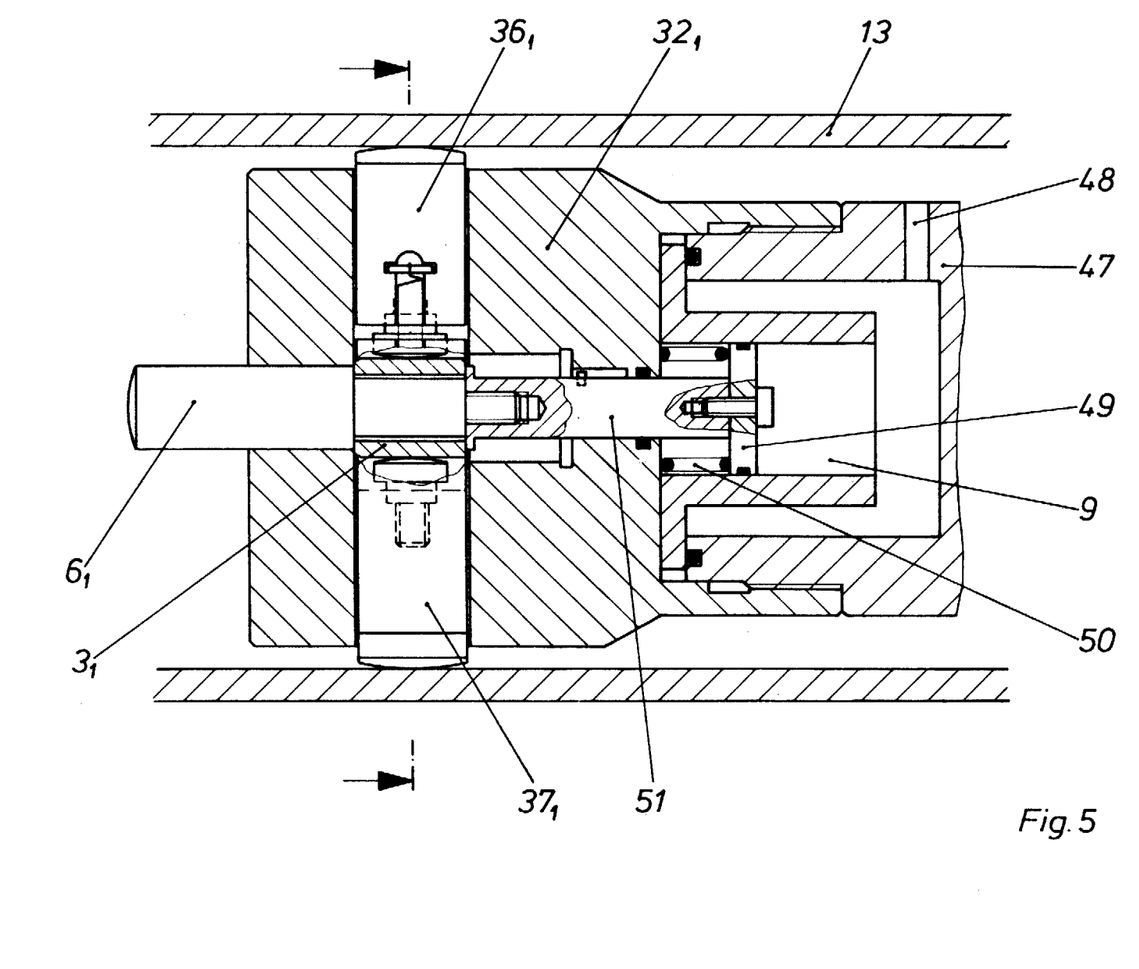
FIG. 5 is a longitudinal cross-section through another boring tool according to the present invention in which the spacer is movable by cooling oil under pressure.

FIG. 5 illustrates a further embodiment according to the present invention, which is very similar in construction and function to that described in connection with FIG. 4. In the embodiment shown in FIG. 5 the safety bolt 38 of the embodiment shown in FIG. 4 is replaced by a piston rod 51, the outer or right end of which, as viewed in FIG. 5, is connected to a piston 49 movable in a cylinder 9 coaxial with the tool head 32 and connected to the latter between opposite faces of the tool head and a boring tube 47 which is screwed into an annular portion of the tool head 32. The rear face, or left face of the piston 49, as viewed in FIG. 5, is engaged by a compression spring 50 so as to bias the piston 49 towards the right, as viewed in FIG. 5. The boring tube 47 carrying the tool head 32 is provided with a transverse bore 48 through which flushing oil under high pressure, used during operation of the boring tool, passes into the cylinder 9 to act thereby on the right face, as viewed in FIG. 5, of the piston 49 to thus move the piston rod 51 and the spacer member $36_1$ connected thereto towards the left, as viewed in FIG. 5, between the adjustable stops on the knives $36_1$ and $37_1$, to thereby hold these knives in their working position. If further supply of oil is interrupted, for instance at the end of the machining operation, then the compression spring 50 moves the piston 49 toward the right, as viewed in FIG. 5, and the spacer member $3_1$ in a corresponding direction so that the knives $36_1$ and $37_1$ may move toward each other, whereby the cutting edges of the knives are removed from the finished bore in the workpiece.

Figure 6:
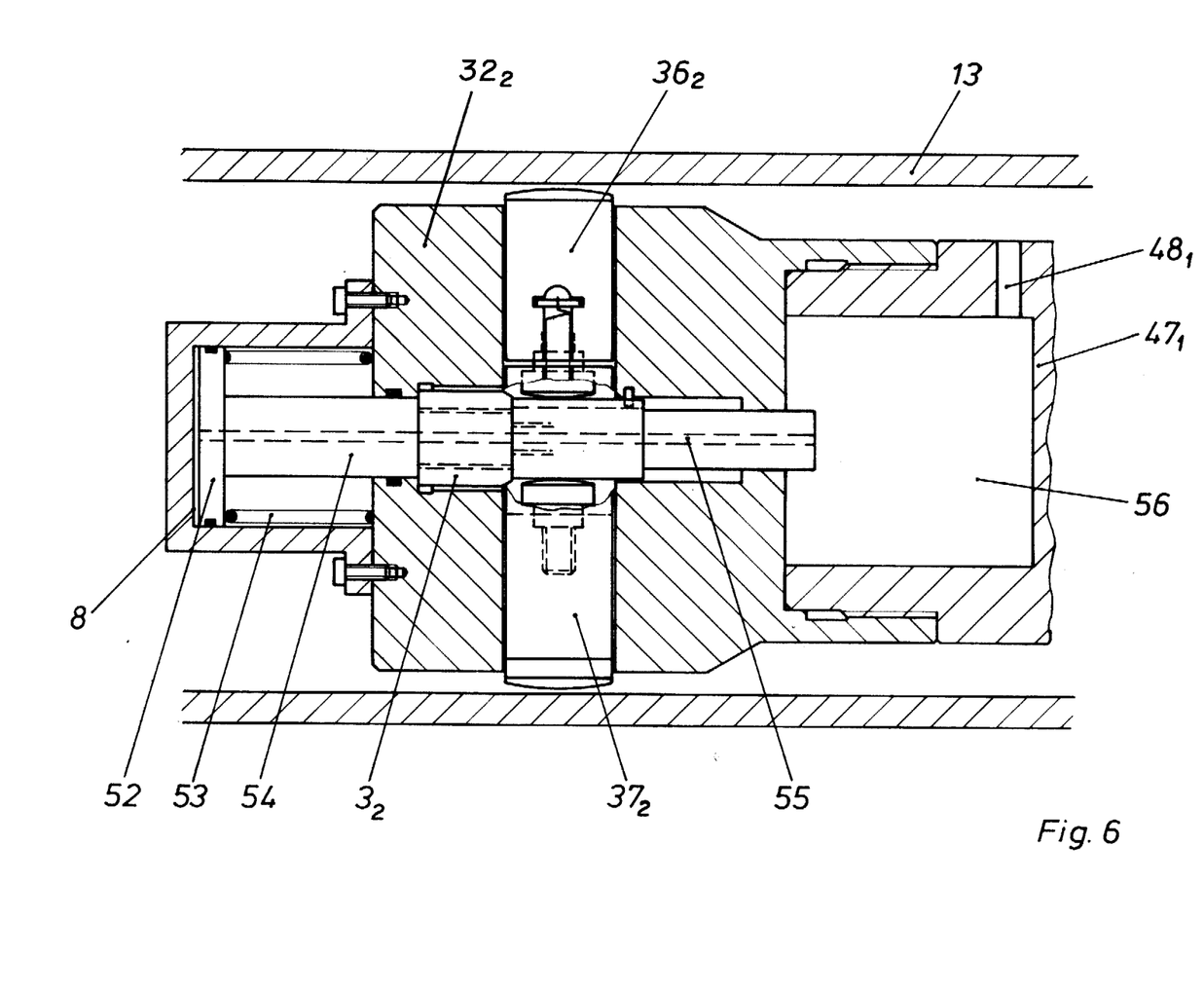
FIG. 6 is a longitudinal cross-section through a further embodiment in which the spacer is likewise movable by cooling oil.

FIG. 6 illustrates a further embodiment which is similar to the embodiment shown in FIG. 5. However, in the embodiment shown in FIG. 6 a cylinder 8 is connected by screws to the front face or left end face of the tool head $32_2$. A piston 52 is guided for axial movement in the cylinder 8 and the piston 52 is biased by a return compression spring 53, sandwiched between the piston and the front face of the tool head 32, towards the left, as viewed in FIG. 6. The piston 52, is connected with a piston rod 54 which carries the spacer member $3_2$. The piston rod 54 and the piston 52 are formed with a central bore 55 through which the cylinder space to the left side of the piston 52 as viewed in FIG. 6, may be supplied with a pressure medium. The pressure medium is preferably constituted by flushing oil under pressure used during the operation of the boring tool which passes through a cross bore $48_1$ in the boring tube $47_1$ into a chamber 56 and from there through the axial bore 55 into the cylinder space at the front of the piston 52 to move the latter against the force of the return spring 53 and therewith the spacer member $3_2$ toward the right, as viewed in FIG. 6, between the knives $36_2$ and $37_2$, respectively between the stops 4 connected to the inner ends of the knives to bring the latter to the working position. If further feeding of flushing oil is stopped so that no fluid pressure is exerted on the piston 52, the latter is moved by the return spring 53 to the position shown in FIG. 6, whereby the spacer member $3_2$ is also moved back to the position shown in FIG. 6, freeing thereby the knives $36_2$ and $37_2$ to move toward each other to the inactive position shown in FIG. 6, in which the cutting edges of the knives are disengaged from the inner surface of the workpiece 13.

Figure 7:
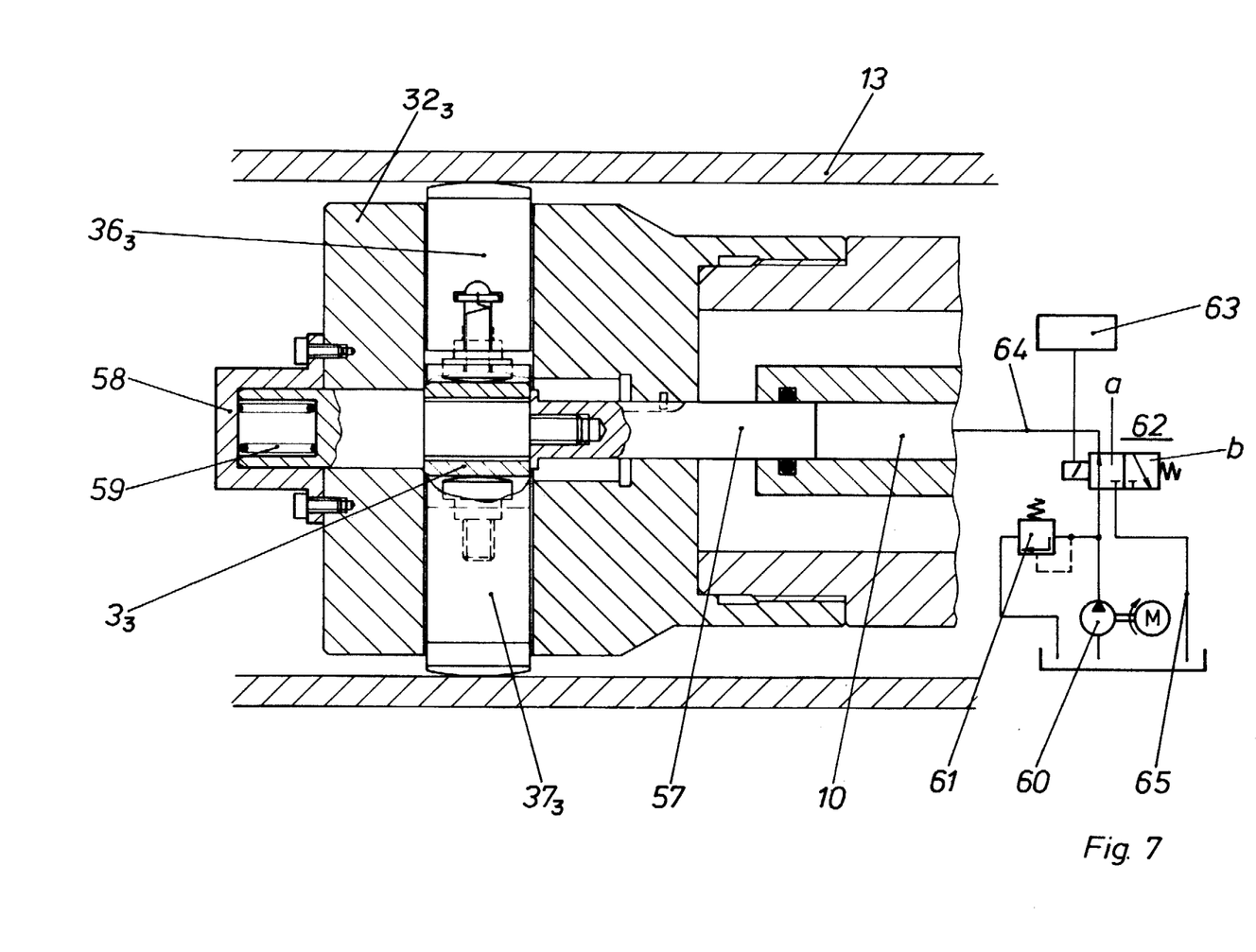
FIG. 7 is a longitudinal cross-section through another boring tool in which the spacer is movable by fluid pressure provided by a pump.

FIG. 7 illustrates a further embodiment which is similar to the embodiment shown in FIG. 5. The embodiment shown in FIG. 7 differs from that shown in FIG. 5 in that the piston rod 57 is in this embodiment constructed as a plunger which extends into a cylinder 10 arranged in the boring tube 47. The cylinder 10 is supplied with pressure fluid through a conduit 64 from a pump 60 driven by a motor M, if the solenoid operated valve 62 is in the position "a". An overpressure valve 61 in circuit with the conduit 64 regulates the pressure of the fluid fed into the cylinder 10. The solenoid of the valve 62 is controlled by control means 63 of known construction and only schematically indicated in FIG. 7. If pressure fluid acts on the plunger or piston 57, then the latter is moved against the pressure of a return spring 59 in a spring pot 58 connected by screws to the front face of the tool head $32_2$, to the position as shown in FIG. 7, in which the spacer member $3_3$ is located between the stops 4 respectively connected to the inner ends of the knives $36_3$ and $37_3$ to thereby hold the knives in the working position. After the tool head 32 has finished its working stroke, the control device 63 switches the solenoid separated valve 62 to the position "b" whereby the pressure fluid is released from the cylinder 10 over the conduits 64 and 65 so that the return spring 59 moves the plunger 57 into the cylinder 10 and thereby the spacer member $3_3$ out of the space between the knives $36_3$ and $37_3$, so that the latter move toward each other to an inactive position in which the cutting edges of the knives are removed from the inner surface of the workpiece 13. The boring tool shown in FIG. 7 is thus independent of outer mechanical switching arrangements and also independent from the use of a flushing oil under substantial pressure. The knives can be at any time and at any place be moved from the working position to the inactive position and vice versa. The cylinder 10 may be constructed as a separate cylinder fixedly arranged in the boring tube 47 or the latter may be used as a cylinder in which case a corresponding piston has to be connected to the right end of the plunger.

Figure 8:
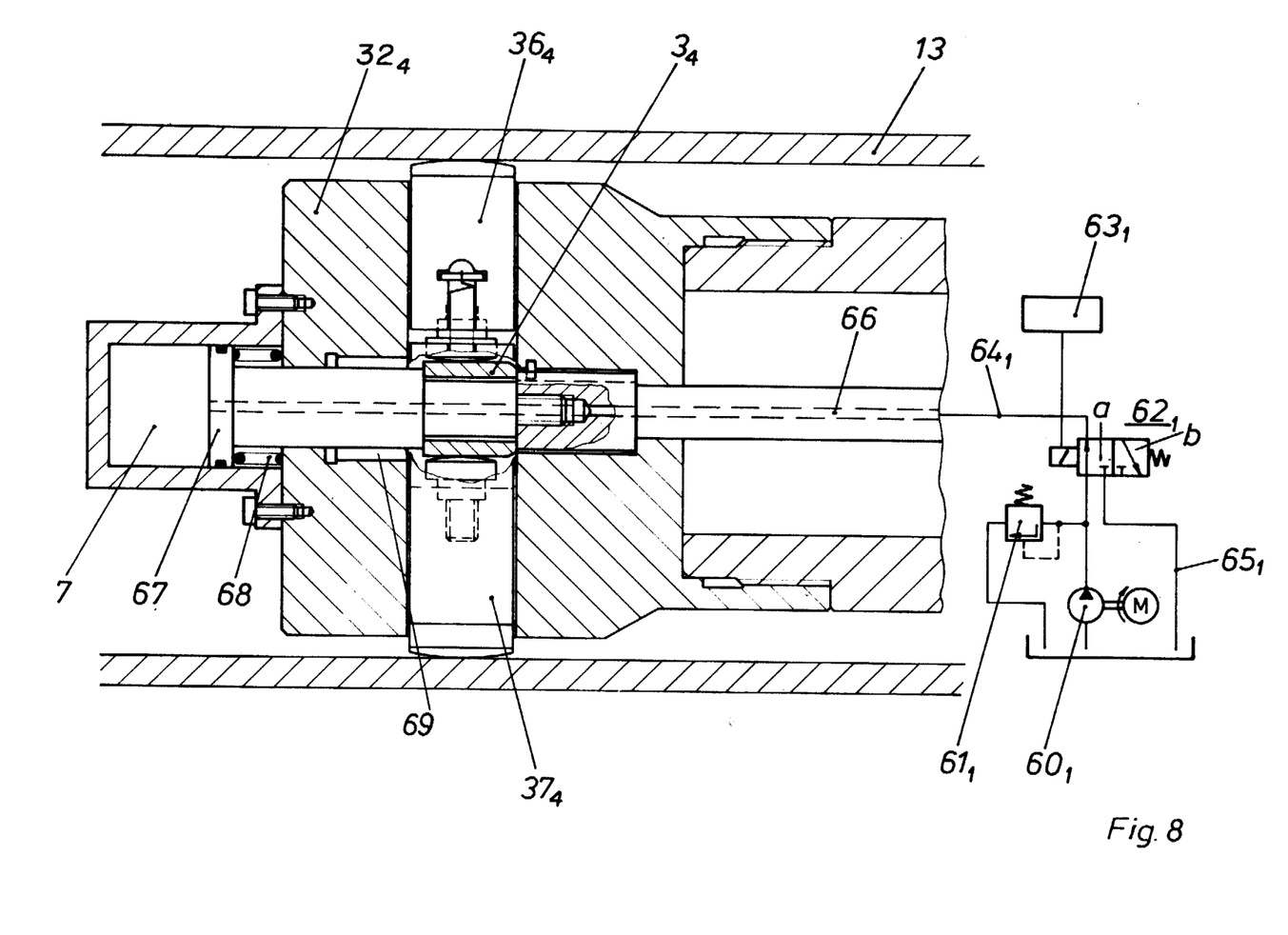
FIG. 8 is a longitudinal cross-section through an additional boring tool in which the spacer is likewise movable by pressure fluid provided by a pump.

FIG. 8 illustrates a further modification which is similar to that shown in FIG. 6 in which, however, the movement of the spacer member $3_4$ is controlled in the same manner as described in connection with FIG. 7. In a manner similar as shown in FIG. 6, a cylinder 7 is connected by screws to the front face of the boring head $32_4$ in which a piston 67 is arranged for reciprocation. The piston 67 is biased towards the left, as viewed in FIG. 8, by a return compression spring 68 abutting with opposite ends against the front face of the tool head 32 and the rear face of the piston 67. Pressure fluid is fed into the cylinder 7 through an axial bore 66 in the manner as described in connection with FIG. 7, whereby the piston a 67 is moved to the position as shown in FIG. 8 and the spacer member $3_4$ between the knives $36_4$ and $37_4$, to thereby hold the latter in their working position. If the solenoid operated valve $62_1$ is then switched over by the control device $63_1$ to the position "b", then the return spring 68 moves the piston 67 toward the left, as viewed in FIG. 8, and thereby the spacer member $3_4$ into the pocket 69 arranged to the left side of the slot receiving the knives $36_4$ and $37_4$, so that the latter may move toward each other to an inactive position, in which the cutting edges thereof are disengaged from the inner surface of the workpiece 13.

With the present invention it is for the first time possible to automatically retract the knives of the boring tool so that the latter after machining of the inner surface of the workpiece 13 may be withdrawn without any danger of damaging the finished inner surface of the workpiece.

This arrangement according to the present invention is especially advantageous when the boring tool is combined with burnishing rollers in the manner as for instance disclosed in the DT-OS No. 22 23 696. Since in such a combined tool the inner surface of the bore is in one operation machined and smoothed the danger of an undue damage of the inner surface by the knives of the boring tool during return stroke of the combined tool is especially great. With the construction according to the present invention such damage is positively avoided.

It is to be understood that in the embodiment shown in FIGS. 5-8 the spacer members $3_1$-$3_4$ are each also formed with an oblong axial bore as shown at 3' in FIG. 9 to permit the spacer members to carry out a slight pendulating movement together with the respective members cutting knives.

It will be understood that each of the elements described above, or two or more together, may also find a useful application is other types of boring tools differing from the types described above.

While the invention has been illustrated and described as embodied in a boring tool having a pair of opposite cutting knives movable to an active position by a spacer member to be moved between inner ends of the cutting knives and retractable therefrom to permit the cutting knives to move to an inactive position, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a bearing tool, a combination comprising a tool head having an axis and being provided with a slot extending transverse to said axis; a pair of opposite cutting knives floatably mounted in said slot movable away from each other to a cutting position and toward each other to an inactive position, each of said cutting knives having an other cutting edge and an inner end face opposite a corresponding end face of the other cutting knife; biasing means cooperating with said cutting knives for biasing the same toward each other to said inactive position; spacer means having a pair of opposite faces and a face extending transverse to said opposite faces, said spacer means being movable in said tool head between two positions in one of which said opposite faces respectively engage said inner end faces of said cutting knives to hold the latter in said cutting position in which said cutting edges of said knives are spaced a fixed predetermined distance from each other and in another of which said spacer means permit said cutting knives to move toward each other to said inactive position under the influence of said biasing means; stop means arranged for engagement with the transverse face of said spacer means in said one position of the latter; and means for moving said spacer means between said one position in which said transverse face of said spacer means engages said stop means to thereby hold said cutting knives in said cutting position, and said other position in which said spacer means permits said cutting knives to move said inactive position.

2. A combination as defined in claim 1, wherein said spacer means is movable in the direction of said axis and comprises a stepped spacer member having two portions following each other in the direction of said axis with one of said portions having in a direction transverse to said axis a greater dimension than the other of said portions.

3. A combination as defined in claim 2, wherein at least said one portion has a pair of faces respectively engaged by said inner faces of said cutting knives when the latter are in said cutting position.

4. A combination as defined in claim 3, wherein said pair of faces extend parallel to said axis.

5. A combination as defined in claim 1, and including a stop connected to each of said cutting knives adjustable in a direction transverse to said axis, said cutting knives abutting with said respective stops against said spacer means.

6. A combination as defined in claim 1, and including a guide tongue on each of said cutting knives for guiding said spacer means.

7. A combination as defined in claim 1, wherein said means for moving said spacer means comprise a bolt mounted in said tool head movable in direction of said axis.

8. A combination as defined in claim 7, wherein said spacer means is mounted on said bolt for movement with the latter in direction of said axis and for limited movement transverse thereto.

9. A combination as defined in claim 8, wherein said bolt constitutes a piston rod, and including a cylinder space provided in said tool head, a piston connected to said piston rod and axially movable in said cylinder space, and means for feeding pressure fluid into said cylinder space at least to one side of said piston.

10. A combination as defined in claim 9, wherein said feeding means feeds pressure fluid into said cylinder space only to one side of said piston so as to move said spacer means mounted on said bolt in one direction between said faces of said cutting members, and including spring means for biasing said bolt in a direction opposite to said one direction.

11. A combination as defined in claim 1, wherein said tool head is provided at one side of said slot with a spacer pocket, and wherein said spacer means is movable in direction of said axis between said positions thereof and is located in said other position in its entirety in said pocket.

12. A combination as defined in claim 11, wherein said tool head has a front face, and including spring means biasing said spacer means to said one position, said moving means comprising a bolt having a front end portion projecting beyond said front face of said tool head and a rear end engaging said spacer means and being guided in said tool head for movement in direction of said axis for moving said spacer means against the force of said biasing means to said other position, and including arresting means for releasably arresting said bolt in a position in which the latter holds said spacer means in said other position.

13. A combination as defined in claim 1, wherein said tool head has a front face and a rear face and is formed with a stepped axial bore between said front face and said rear face and forming to one side of said slot a spacer pocket, said spacer means being formed with an oblong bore therethrough having in the direction of said slot a longer dimension and in the direction normal to said slot a smaller dimension, said moving means comprising bolt means extending through said axial bore and said oblong bore and having in the latter a portion of a diameter slightly smaller than said smaller dimension of said oblong bore, said bolt means engaging said spacer means and having opposite ends respectively projecting beyond said front and rear face of said tool head.

14. A combination as defined in claim 13, wherein said moving means include a piston connected to one end of said bolt means, cylinder means connected to one of said faces of said tool head and guiding said piston in axial direction, means for feeding a pressure fluid into said cylinder means to one side of said piston for moving the latter in one direction, and spring means operatively connected to said bolt means for biasing the latter in the direction opposite to said one direction.

15. A combination as defined in claim 14, wherein said means for feeding pressure fluid into said cylinder means comprises a pump and including valve means connected in circuit between said pump and said cylinder means and movable between a first position in which pressure fluid from said pump is fed into said cylinder means and a second position in which pressure fluid is discharged from said cylinder means.

16. A combination as defined in claim 15, wherein said cylinder means is connected to said front face of said tool head, and wherein said means for feeding said pressure fluid into said cylinder means comprise an axial bore extending through said bolt means and said piston.

17. A combination as defined in claim 1, wherein said stop means is constituted by a portion of a face defining said slot.

18. A combination as defined in claim 17, wherein said opposite faces of said spacer means having a predetermined length, said spacer means being movable in said tool head only between two positions in one of which said opposite faces of said spacer means respectively engage said inner end faces of said cutting knives to hold the latter in said cutting position and said transverse face engages said portion of said face defining said slot, and in the other of which said transverse face is spaced at least said predetermined distance from said face portion so that said cutting knives will move to said inactive position under the influence of said biasing means.

* * * * *